US010012986B2

United States Patent
Kurt et al.

(10) Patent No.: US 10,012,986 B2
(45) Date of Patent: Jul. 3, 2018

(54) METHOD FOR AUTONOMOUSLY PARKING A MOTOR VEHICLE FOR HEAD-IN, TAIL-IN, AND PARALLEL PARKING SPOTS

(71) Applicants: Dura Operating, LLC, Auburn Hills, MI (US); Ohio State Innovation Foundation, Columbus, OH (US)

(72) Inventors: Arda Kurt, Dublin, OH (US); Keith Redmill, Columbus, OH (US); Gordon Thomas, Beverly Hills, MI (US); Umit Ozguner, Dublin, OH (US)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 15/242,173

(22) Filed: Aug. 19, 2016

(65) Prior Publication Data
US 2018/0052459 A1     Feb. 22, 2018

(51) Int. Cl.
*G01C 22/00*     (2006.01)
*G05D 1/00*     (2006.01)
(Continued)

(52) U.S. Cl.
CPC ........... *G05D 1/0088* (2013.01); *B60W 30/06* (2013.01); *B62D 15/0285* (2013.01);
(Continued)

(58) Field of Classification Search
CPC ............... G05D 1/0088; G05D 1/0212; G05D 2201/0213; G01C 21/3453; G01C 21/3605
See application file for complete search history.

(56) References Cited

U.S. PATENT DOCUMENTS 7,844,377 B2    11/2010    Oota et al.
7,969,558 B2    6/2011    Hall
(Continued)

FOREIGN PATENT DOCUMENTS

DE    102007002267 A1    8/2008
DE    102014224075 A1    6/2016
(Continued)

OTHER PUBLICATIONS

Marcos Gomes Prado, "Planejamento de trajetoria para esticionamento de veiculos automonos", Dissertation, Apr. 1, 2013, pp. 1-84.
(Continued)

*Primary Examiner* — Hussein A El Chanti
(74) *Attorney, Agent, or Firm* — Robert E. Ford; Raymond J. Vivacqua; Steven L. Crane

(57) ABSTRACT

A method for autonomously parking a motor vehicle in various types of parking spots includes the steps of receiving a map of a parking area, locating the motor vehicle within the parking area, selecting a parking spot within the parking area, generating a node tree from the location of the motor vehicle to the parking spot, selecting a path from the node tree, wherein the path connects the location of the motor vehicle to the parking spot, autonomously driving the motor vehicle along the path from the location of the motor vehicle to an intermediate location on the path, and performing a parking maneuver into the parking spot from the intermediate location. The parking maneuver may be a head-in, tail-in, or parallel parking maneuver.

19 Claims, 3 Drawing Sheets

(51) Int. Cl.
*G01C 21/34* (2006.01)
*G01C 21/36* (2006.01)
*G05D 1/02* (2006.01)
*B62D 15/02* (2006.01)
*B60W 30/06* (2006.01)

(52) U.S. Cl.
CPC ......... *G01C 21/34* (2013.01); *G01C 21/3453* (2013.01); *G01C 21/3605* (2013.01); *G05D 1/0212* (2013.01); *G05D 2201/0213* (2013.01)

(56) References Cited

U.S. PATENT DOCUMENTS

| | | |
|---|---|---|
| 8,675,181 B2 | 3/2014 | Hall |
| 8,767,190 B2 | 7/2014 | Hall |
| 9,194,168 B1 | 11/2015 | Lu et al. |
| 9,552,564 B1* | 1/2017 | Martenis ............... G06Q 10/083 |
| 2006/0212216 A1 | 9/2006 | Kobayashi et al. |
| 2010/0020306 A1 | 1/2010 | Hall |
| 2011/0216304 A1 | 9/2011 | Hall |
| 2012/0101654 A1 | 4/2012 | Samples et al. |
| 2012/0188100 A1* | 7/2012 | Min ....................... G08G 1/143 |
| | | 340/932.2 |
| 2013/0179067 A1* | 7/2013 | Trowbridge ....... G01C 21/3484 |
| | | 701/410 |
| 2013/0231824 A1 | 9/2013 | Wilson et al. |
| 2015/0025732 A1 | 1/2015 | Min et al. |
| 2015/0073645 A1 | 3/2015 | Davidsson et al. |
| 2015/0106010 A1* | 4/2015 | Martin ................... G01C 21/34 |
| | | 701/410 |
| 2015/0185734 A1 | 7/2015 | Minolu-Enache |
| 2016/0155331 A1* | 6/2016 | Mielenz .................. G08G 1/14 |
| | | 340/932.2 |
| 2016/0311429 A1* | 10/2016 | Holland-Letz ..... B62D 15/0285 |
| 2016/0364985 A1* | 12/2016 | Penna .................... G08G 1/143 |
| 2017/0021828 A1* | 1/2017 | Seo ........................ B60W 30/06 |
| 2017/0232891 A1* | 8/2017 | Nordbruch ............. B60Q 9/002 |
| | | 701/23 |

FOREIGN PATENT DOCUMENTS

| | | |
|---|---|---|
| EP | 1499522 B1 | 12/2009 |
| WO | 2008032354 A1 | 3/2008 |
| WO | 2016066355 A1 | 5/2016 |

OTHER PUBLICATIONS

Christian Loeper et al., "Automated valted parking as part of an integrated travel assistance", Proceedings for the 16th International IEEE Annual Conference on Intelligent Transportation Systems (ITSC 2013), Oct. 6, 2013, pp. 2341-2348.
Maxim Likhachev et al., "Planning long dynamically feasible maneuvers for automornous vehicles", The International Journal of Robotics Research, Aug. 1, 2009, pp. 933-945.
Stephan Rottmann et al., "Demo: Automated valet parking and charging", 2014 IEEE Vehicular Networking Conference (VNC), Dec. 3, 2014, pp. 203-204.

* cited by examiner

METHOD FOR AUTONOMOUSLY PARKING A MOTOR VEHICLE FOR HEAD-IN, TAIL-IN, AND PARALLEL PARKING SPOTS

FIELD

The invention relates generally to autonomous driver assistance systems for motor vehicles, and more particularly to autonomous driver assistance systems for parking a motor vehicle in a head-in, tail-in, and parallel parking spot.

BACKGROUND

The statements in this section merely provide background information related to the present disclosure and may or may not constitute prior art.

Smart car technologies such as free-ranging on grid navigation, as well as parking guidance and information systems, aid in the prevention of human error when drivers operate a vehicle. Such technologies have been used to improve navigation of roadways, and to augment the parking abilities of motor vehicle drivers while the drivers are present within the motor vehicle. For example, rear view camera systems and impact alert systems have been developed to assist the operator of the motor vehicle while parking to avoid collisions. In addition, autonomous parking systems have been developed that autonomously park the motor vehicle in a parallel parking spot once the operator of the motor vehicle has positioned the motor vehicle in a predefined location proximate the parking spot.

While these systems are useful for their intended purpose, they require that the operator of the motor vehicle locate the parking spot and drive to the parking spot. Moreover, none are able to determine which type of parking maneuver is appropriate for a given parking spot, for example, tail-in, head-in, or parallel parking. Thus, there is a need in the art for improved smart car technologies that utilize preexisting infrastructure to autonomously park a motor vehicle in any type of parking spot. Moreover, there is a need to implement automatic parking systems in motor vehicles that do not increase cost, and which also increase the accuracy and robustness of parking systems while providing additional redundant ease of access and safety features.

SUMMARY

A method for autonomously parking a motor vehicle in various types of parking spots is provided. The method includes the steps of receiving a map of a parking area, locating the motor vehicle within the parking area, selecting a parking spot within the parking area, generating a node tree from the location of the motor vehicle to the parking spot, selecting a path from the node tree, wherein the path connects the location of the motor vehicle to the parking spot, autonomously driving the motor vehicle along the path from the location of the motor vehicle to an intermediate location on the path, and performing a parking maneuver into the parking spot from the intermediate location.

In one aspect, the parking maneuver is one of a head-in parking maneuver, a tail-in parking maneuver, and a parallel parking maneuver.

In another aspect, which of the parking maneuvers is performed is a function of a sensor coverage of the motor vehicle.

In another aspect, the tail-in parking maneuver is prohibited if a rear of the motor vehicle lacks sufficient sensor coverage.

In another aspect, the head-in parking maneuver is prohibited if a front of the motor vehicle lacks sufficient sensor coverage.

In another aspect, the parking maneuver includes a head-in parking maneuver.

In another aspect, the parking maneuver includes a tail-in parking maneuver.

In another aspect, the parking maneuver includes a parallel parking maneuver.

In another aspect, generating a node tree includes (a) generating a first set of nodes from the location of the motor vehicle, (b) assigning a cost to each node in the first set of nodes, (c) selecting a lowest cost node from the first set of nodes, (d) generating another set of nodes linked to the selected node and offset from the selected node by a fixed distance and a steering angle, (e) assigning a cost to each of the newly generated nodes, wherein the cost of a node is equal to a base cost plus an inherited cost from the selected node, a turning cost, and a reverse cost if the newly generated node is behind the selected node, (f) selecting a lowest cost node from all of the nodes, and (g) repeating steps (d)-(f) until a lowest cost node is located at the parking spot.

In another aspect, selecting a path from the node tree includes selecting a path from the location of the motor vehicle to the parking spot comprising the last selected lowest cost node and parent nodes connected to the last selected lowest cost node.

In another aspect, nodes between the location of the motor vehicle and the intermediate location are in an approach phase and the nodes between the intermediate location and the parking spot are in a park phase, and wherein the turning cost and the reverse cost are different in the approach phase than in the parking phase.

In another aspect, the turning cost and the reverse cost are greater in the approach phase than in the parking phase.

In another aspect, the intermediate location is set a predefined distance from the parking spot.

In another aspect, the parking maneuver is a function of the type of selected parking spot.

Further aspects, examples, and advantages will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views.

DETAILED DESCRIPTION

The following description is merely exemplary in nature and is not intended to limit the present disclosure, application or uses.

Figure 1:
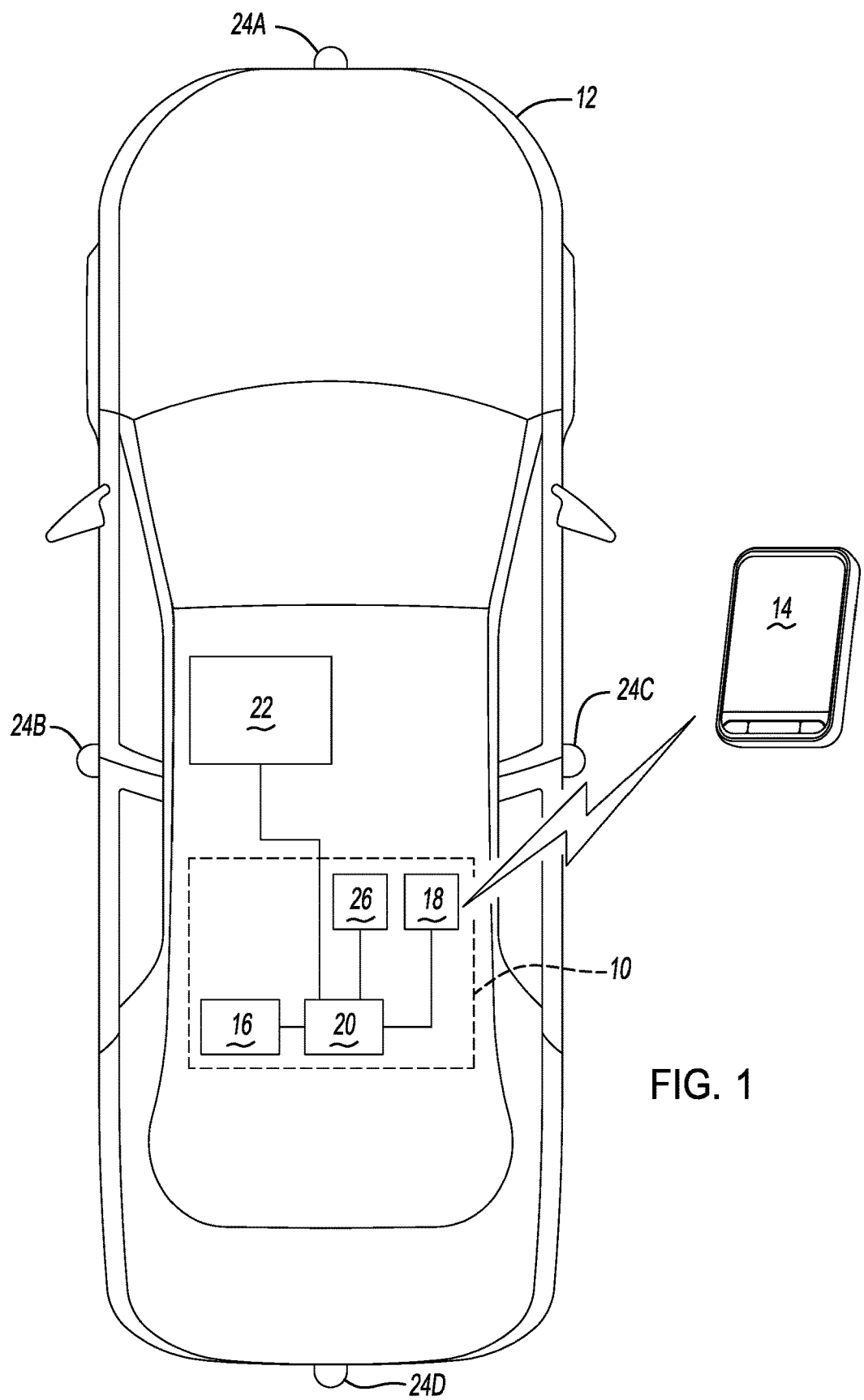
FIG. 1 is a schematic diagram of an exemplary motor vehicle having an automatic valet system according to the principles of the present disclosure.

With reference to FIG. 1, an autonomous valet system according to the principles of the present disclosure is indicated by reference number 10. The autonomous valet system 10 is used with an exemplary motor vehicle 12 and an exemplary mobile device 14. The motor vehicle 12 is illustrated as a passenger vehicle, however, the motor vehicle 12 may be a truck, sport utility vehicle, van, motor home, or any other type of vehicle without departing from the scope of the present disclosure. The mobile device 14 is preferably a mobile phone, however, the mobile device 14 may be a mobile computer, laptop, tablet, smart watch, or any other device in wireless communication with the motor vehicle 12. The autonomous valet system 10 runs an autonomous valet method or application, as will be described in greater detail below.

The autonomous valet system 10 is operable to autonomously park and un-park the motor vehicle 12. The autonomous valet system 10 may have various configurations without departing from the scope of the present disclosure but generally includes a sensor sub-system 16 and a communication sub-system 18 each in communication with a controller 20. The controller 20 communicates with a vehicle control system 22. The sensor sub-system 16 includes a plurality of sensors 24A-D mounted along the periphery of the motor vehicle 12. In the example provided, the sensors 24A-D are located at the front, left, right, and rear of the motor vehicle 12, respectively, to provide 360 degrees of overlapping coverage. However, it should be appreciated that the sensor sub-system 16 may have any number of sensors 24 without departing from the scope of the disclosure. Each of the sensors 24A-D is operable to collect or sense information in a predefined area surrounding the motor vehicle 12. Information from the sensors 24A-D is communicated to the controller 20. In a preferred embodiment, the sensors 24A-D are Light Detection and Ranging (LiDAR) sensors. However, the sensors 24A-D may be cameras, radar or sonar sensors, or any other type of proximity sensors. The communication sub-system 18 includes a receiver/transmitter operable to receive and/or transmit wireless data to the mobile device 14. The wireless data is communicated to the controller 20. In addition, the communication sub-system 18 may communicate with other vehicles (vehicle-to-vehicle communication), infrastructure such as a parking lot (vehicle-to-infrastructure), and may receive GPS data.

The controller 20 is a non-generalized, electronic control device having a preprogrammed digital computer or processor, memory or non-transitory computer readable medium used to store data such as control logic, instructions, image data, lookup tables, etc., and a plurality of input/output peripherals or ports. The processor is configured to execute the control logic or instructions. The controller 20 may have additional processors or additional integrated circuits in communication with the processor, such as perception logic circuits for analyzing the sensor data.

The controller 20 may optionally communicate with a human machine interface (HMI) 26. The HMI 26 is disposed within the cabin of the motor vehicle 12 and is preferably a touch screen accessible by an operator of the motor vehicle 12. However, the HMI 26 may be any haptic, verbal, or gesture control system without departing from the scope of the present disclosure. The HMI 26 may be used to activate and control the autonomous valet system 10. Additionally, the mobile device 14 may be used to activate and control the autonomous valet system 10.

The vehicle control system 22 includes any systems that implement the autonomous valet functions which include parking and un-parking the motor vehicle 12. For example, the vehicle control system 22 may include a braking control system, throttle control system, steering control system, body control system, etc. The vehicle control system 22 may also include any advanced driver assistance system (ADAS) functions that automate, adapt, or enhance vehicle systems in order to increase vehicle safety and/or operator driving performance. For example, the vehicle control system 22 may include ADAS technologies that alert the driver to potential problems or to avoid collisions by implementing safeguards, such as autonomously controlling the motor vehicle 12. The vehicle control system 22 may also include ADAS features that enhance certain systems, such as automated lighting, adaptive cruise control, automated braking, or improved blind spot elimination using camera technology. Finally, it should be appreciated that the vehicle control system 22 may be part of the autonomous valet system 10 without departing from the scope of the present disclosure.

Figure 2:
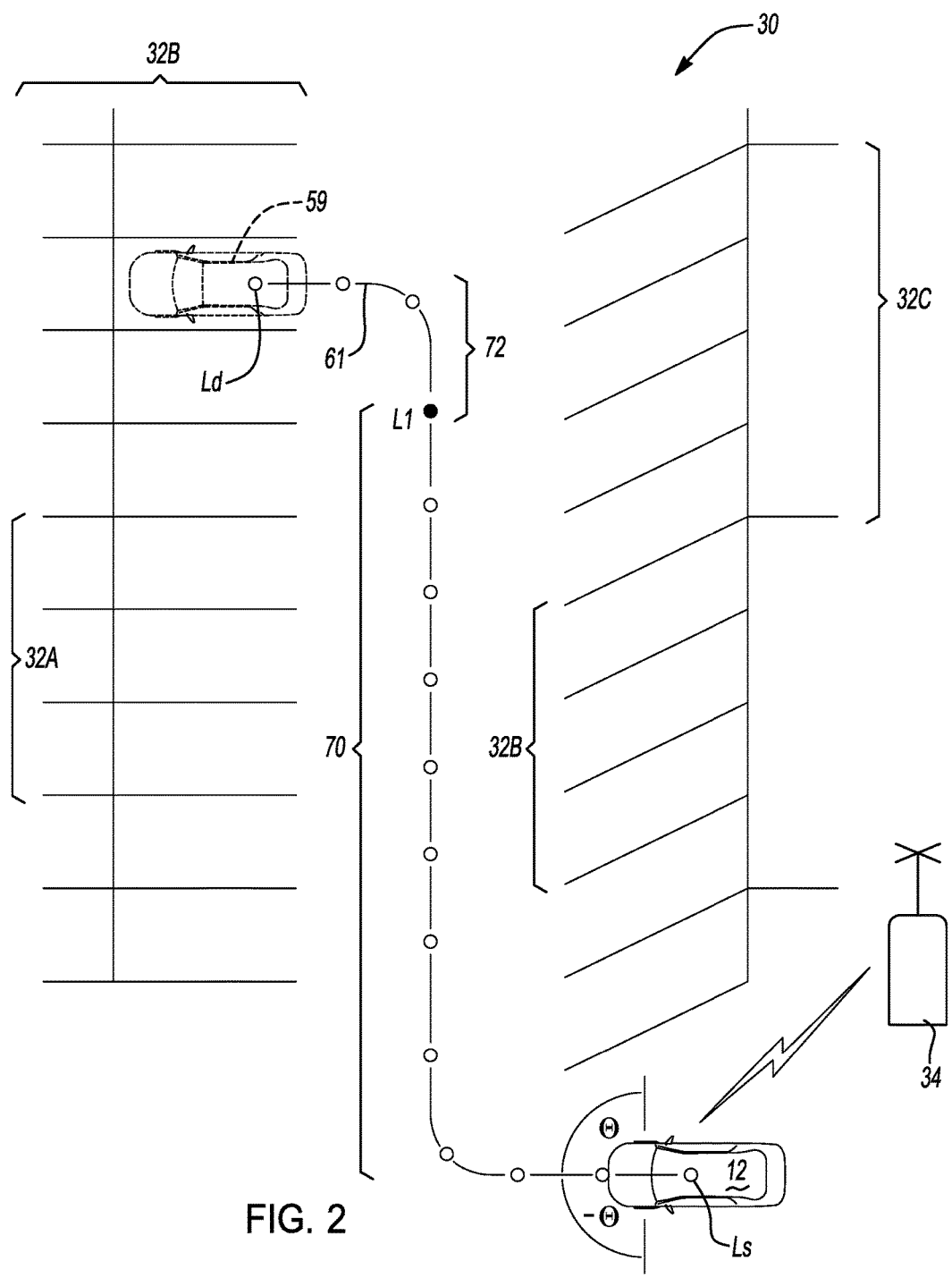
FIG. 2 is a schematic diagram of an exemplary parking area.

Turning to FIG. 2, an exemplary parking area is indicated by reference number 30. The parking area 30 includes a plurality of parking spots 32. The parking spots 32 include, in the example provided, perpendicular parking spots 32A, angled parking spots 32B, and parallel parking spots 32C. It should be appreciated that the parking area 30 may have any configuration, may be a parking structure, and may have any number and type of parking spots 32 without departing from the scope of the present disclosure. The parking area 30 includes a parking area infrastructure 34 that may communicate with the motor vehicle 12.

Figure 3:
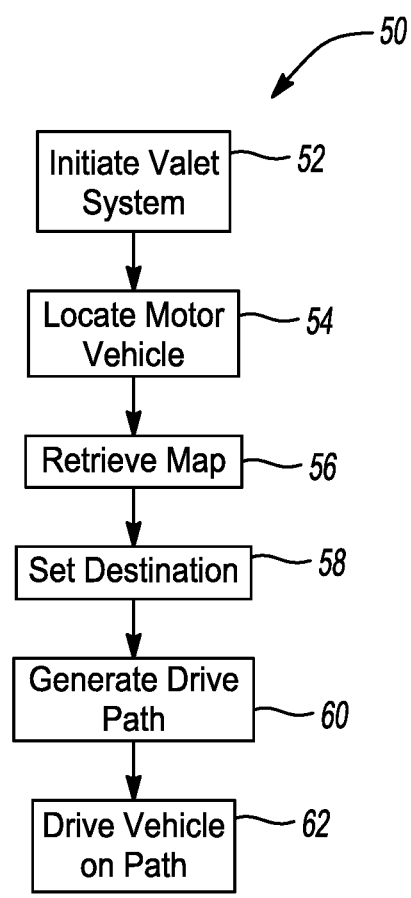
FIG. 3 is a flow chart depicting a method for autonomously parking and un-parking the motor vehicle according to the principles of the present disclosure.

With reference to FIG. 3, and continued reference to FIGS. 1 and 2, a method for autonomously parking the motor vehicle 12 in the parking area 30 is indicated by reference number 50. The method 50 begins at step 52 where an operator of the motor vehicle 12 initiates or activates the autonomous valet system 10 using either the HMI 26 or the mobile device 14.

At step 54, the motor vehicle 12 is located within, or relative to, the parking area 30. The motor vehicle 12 may be located in the parking area 30 by positioning the motor vehicle 12 in a predefined starting location or parking spot or by GPS coordinates. At step 56 the motor vehicle 12 communicates with the parking area infrastructure to receive a map of the parking area 30. The map may be defined as a Cartesian coordinate system with x and y coordinates. The motor vehicle 12 is located on the map using (x,y,Θ) coordinates, where Θ is a steering angle or a heading of the motor vehicle 12. At step 58, a destination is set in the parking area 30. In the example provided, the destination is a parking spot indicated by reference number 59 in FIG. 2. The destination may be selected by an operator of the motor vehicle 12 or may be assigned by the parking area infrastructure 34 based on open or available parking spots 32. The type of parking spot 32 selected as the destination is communicated to the autonomous valet system 10 by the parking area infrastructure 34. It should be appreciated that steps 54-58 may be done in various orders or simultaneously without departing from the scope of the present disclosure.

Next, at step 60, a node tree path planner is generated from the location of the motor vehicle 12 to the destination location 59. From the node tree path planner a lowest cost path is selected, as shown by reference number 61 in FIG. 2. The lowest cost path 61 operates as a path for the motor vehicle 12 to take from the starting location to the destination location 59. Finally, at step 62, the autonomous valet system 10 drives the mover vehicle along the lowest cost path 61 using the vehicle control system 22. The sensor sub-system 16 may be used during autonomous driving to avoid obstacles not located in the predefined parking area map, such as pedestrians, other vehicles, etc.

Figure 4:
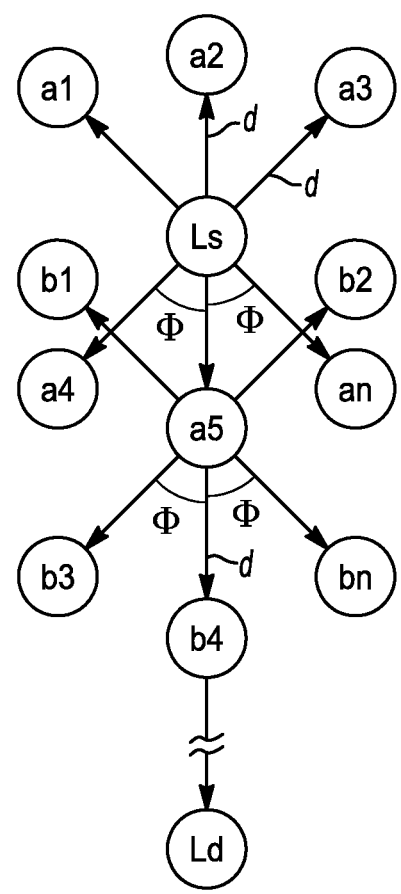
FIG. 4 is an example of a node tree used in the method for autonomously parking and un-parking the motor vehicle.

Turning now to FIG. 4, the method of generating the node tree path planner will now be described in greater detail. The node tree path planner begins by generating a first set of nodes $a_1, a_2, a_3, a_4, a_5 \ldots a_n$ from the starting location $L_s$ of the motor vehicle 12. Each node is generated a distance 'd' from the starting location $L_s$ at a predefined turn angle $\phi$. It should be appreciated that any number of nodes may be generated however, in a preferred embodiment, nine forward nodes are generated and nine reverse nodes are generated. The distance d may have various values but is preferably approximately 2 meters. The turn angle $\phi$ may also have various values but preferably equally divides the nodes from straight ahead to a full right turn and a full left turn. Each of the nodes is defined by $(x,y,\Theta)$ coordinates. Next, any nodes that are blocked by the parking area map are removed or not generated.

Once the first set of nodes are generated, the node tree path planner assigns a cost to each of the nodes. The cost for each node in the first set is equal to a base cost plus a turning cost. The base cost is a function of the distance from the node to the destination location $L_d$. Thus, the closer the node is to the destination location $L_d$, the lower the base cost. The turning cost increases with an increase in the steering angle $\Theta$. In other words, the larger the turn required to reach the node, the greater the cost. If the node is a reverse node that would require the motor vehicle to change gears, an additional reverse cost is added to the node.

Once the nodes have been assigned a cost, the node tree path planner selects the lowest cost node, such as node $a_5$ in the example provided, and generates another set of nodes $b_1, b_2, b_3, b_4 \ldots b_n$ from the selected lowest cost node. Each of the nodes are generated at a distance d from the node $a_5$ at turn angles $\phi$. Any nodes located in areas designated as obstructed by the parking area map are not generated. Moreover, any nodes previously generated are not generated again. Next, costs are assigned to each node $b_1, b_2, b_3, b_4 \ldots b_n$ as described above except that the base cost also includes the cost of node $a_5$. Thus, each child node inherits the cost of the parent node from which it is generated. In one embodiment, the base cost also includes a generation cost which is a function of which generation the node is from the starting location node. The tree node path planner then selects the lowest cost node from all of the nodes generated thus far and repeats the method until a newly generated node is at the destination location $L_d$.

Once a node is at the location $L_d$, the node tree path planner traces the path back to the starting location Ls and sets the path 61. The path 61 includes an approach phase, indicated by reference number 70, and a parking phase, indicated by reference number 72. An intermediate node or location, $L_i$, separates the approach phase 70 from the parking phase 72. In a preferred embodiment, $L_i$ is set a predefined distance away from the destination location $L_d$, i.e., the parking spot. The approach phase 70 is defined as any nodes generated between the location $L_s$ of the motor vehicle 12 and the intermediate location $L_i$. The parking phase 72 is defined as any nodes generated between the intermediate location $L_i$ and the destination location $L_d$.

Generally, the fixed costs associated with the nodes, i.e. the turning cost and the reverse cost, are greater in the approach phase 70 than in the parking phase 72. Thus, the motor vehicle 12 is encouraged to avoid gear changes and turns during the approach phase 70. During the parking phase 72, the autonomous valet system 10 performs a parking maneuver from the intermediate location $L_i$ into the destination location $L_d$. The parking maneuver may be categorized as a head-in parking maneuver, a tail-in parking maneuver, and a parallel parking maneuver. The head-in maneuver is characterized as not having any reverse gear changes in the parking phase 72 such that the front or head of the motor vehicle 12 enters the selected parking spot first. The tail-in maneuver includes at least one gear change into reverse such that the rear or tail of the motor vehicle 12 enters the selected parking spot first. The parallel parking maneuver may be performed either tail first or head first, depending on the size of the parking spot, the location of other parked vehicles fore and aft of the parallel parking spot, etc. During the parking phase 72, node generation may be overridden (i.e. nodes prohibited from generating) or costs governed by the type of parking spot into which the motor vehicle 12 is being parked. For example, an angled parking spot may require a head-in parking maneuver while the parallel parking spot may require the parallel parking maneuver. Thus, certain nodes that would lead to parking maneuvers incompatible with the parking spot may be overridden or have their costs increased. Alternatively, the parking maneuver may be selected by an operator of the motor vehicle 12.

In addition, certain parking maneuvers may be prohibited based on vehicle characteristics. For example, if the sensor sub-system 16 lacks sufficient forward or rearward sensing capabilities, head-in or tail-in parking maneuvers may be prohibited, respectively.

The description of the invention is merely exemplary in nature and variations that do not depart from the gist of the invention are intended to be within the scope of the invention. Such variations are not to be regarded as a departure from the spirit and scope of the invention.

The following is claimed:

1. A method for autonomously parking a motor vehicle, the method comprising:
  receiving a map of a parking area;
  locating the motor vehicle relative to the parking area;
  selecting a parking spot within the parking area;
  generating a plurality of paths each having a cost function from the location of the motor vehicle to the parking spot;
  selecting a path from the plurality of paths based on the cost function, wherein the path connects the location of the motor vehicle to proximal the parking spot;
  autonomously driving the motor vehicle along the path from the location of the motor vehicle to an intermediate location on the path; and
  performing a parking maneuver into the parking spot from the intermediate location:
  wherein generating the plurality of paths includes generating a node tree which includes:
    (a) generating a first set of nodes from the location of the motor vehicle;
    (b) assigning a cost to each node in the first set of nodes;
    (c) selecting a lowest cost node from the first set of nodes;
    (d) generating another set of nodes linked to the selected node and offset from the selected node by a fixed distance and a steering angle;
    (e) assigning a cost to each of the newly generated nodes, wherein the cost of a node is equal to a base cost plus an inherited cost from the selected node, a turning cost, and a reverse cost if the newly generated node is behind the selected node;

(f) selecting a lowest cost node from all of the nodes; and (g) repeating steps (d)-(f) until a lowest cost node is located at the parking spot.

2. The method of claim 1 wherein the parking maneuver is one of a head-in parking maneuver, a tail-in parking maneuver, and a parallel parking maneuver.

3. The method of claim 2 wherein which of the parking maneuvers is performed is a function of a sensor coverage of the motor vehicle.

4. The method of claim 2 wherein the parking maneuver is one of a head-in parking maneuver and a parallel parking maneuver if a rear of the motor vehicle lacks sufficient sensor coverage.

5. The method of claim 2 wherein the parking maneuver is one of a tail-in parking maneuver and a parallel parking maneuver if a front of the motor vehicle lacks sufficient sensor coverage.

6. The method of claim 2 wherein which of the parking maneuvers is performed is selected by an operator of the motor vehicle.

7. The method of claim 2 wherein which of the parking maneuvers is performed is a function of the type of parking spot.

8. The method of claim 2 wherein which of the parking maneuvers is performed is commanded by a parking area infrastructure.

9. The method of claim 1 wherein selecting a path from the node tree includes selecting a path from the location of the motor vehicle to the parking spot comprising the last selected lowest cost node and parent nodes connected to the last selected lowest cost node.

10. The method of claim 9 wherein nodes between the location of the motor vehicle and the intermediate location are in an approach phase and the nodes between the intermediate location and the parking spot are in a park phase, and wherein the turning cost and the reverse cost are different in the approach phase than in the parking phase.

11. The method of claim 10 wherein the steering angle cost and the reverse cost are greater in the approach phase than in the parking phase.

12. The method of claim 1 wherein the intermediate location is set a predefined distance from the parking spot.

13. The method of claim 1 wherein the parking maneuver is a function of the type of selected parking spot.

14. A method for autonomously parking a motor vehicle, the method comprising:
receiving a map of a parking area;
locating the motor vehicle within the parking area;
selecting a parking spot within the parking area;
generating a node tree from the location of the motor vehicle to the parking spot, wherein the node tree includes a plurality of nodes, each node having a base cost plus a fixed cost;
selecting a path from the node tree, wherein the path connects the location of the motor vehicle to the parking spot, and wherein the path includes an approach phase and a parking phase, and wherein the fixed costs in the approach phase are greater than the fixed costs in the parking phase;
autonomously driving the motor vehicle along the path in the approach phase; and
performing a parking maneuver into the parking spot in the parking phase.

15. The method of claim 14 wherein the parking maneuver is one of a head-in parking maneuver, a tail-in parking maneuver, and a parallel parking maneuver.

16. The method of claim 15 wherein which of the parking maneuvers is performed is a function of a sensor coverage of the motor vehicle and a type of selected parking spot.

17. The method of claim 15 wherein the fixed costs include a turning cost and a reverse cost.

18. The method of claim 17 wherein both the turning cost and the reverse cost are greater in the approach phase than in the parking phase.

19. A method for autonomously parking a motor vehicle, the method comprising:
receiving a map of a parking area;
locating the motor vehicle within the parking area;
selecting a parking spot within the parking area;
generating a node tree from the location of the motor vehicle to the parking spot comprising the steps of:
(a) generating a first set of nodes from the location of the motor vehicle;
(b) assigning a cost to each node in the first set of nodes;
(c) selecting a lowest cost node from the first set of nodes;
(d) generating another set of nodes linked to the selected node and offset from the selected node by a fixed distance and a steering angle;
(e) assigning a cost to each of the newly generated nodes, wherein the cost of a node is equal to a base cost plus an inherited cost from the selected node, a turning cost, and a reverse cost if the newly generated node is behind the selected node;
(f) selecting a lowest cost node from all of the nodes; and
(g) repeating steps (d) (f) until a lowest cost node is located at the parking spot;
selecting a path from the node tree, wherein the path connects the location of the motor vehicle to the parking spot, and wherein the path includes an approach phase and a parking phase, and wherein the turning costs and the reverse costs in the approach phase are greater than the turning costs and the reverse costs in the parking phase;
autonomously driving the motor vehicle along the path in the approach phase; and
performing a parking maneuver into the parking spot in the parking phase, wherein the parking maneuver includes one of a tail-in parking maneuver, a head-in parking maneuver, and a parallel parking maneuver.

\* \* \* \* \*